United States Patent Office 3,468,603
Patented Sept. 23, 1969

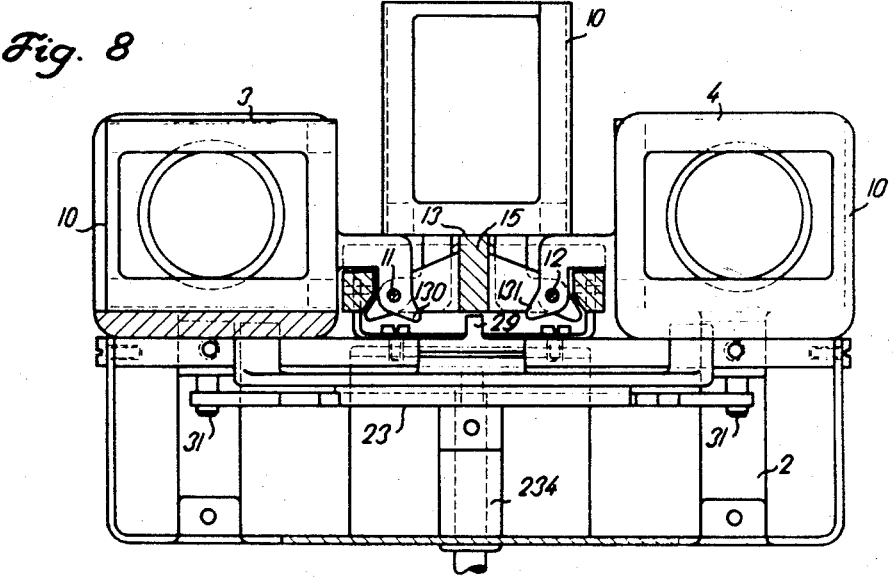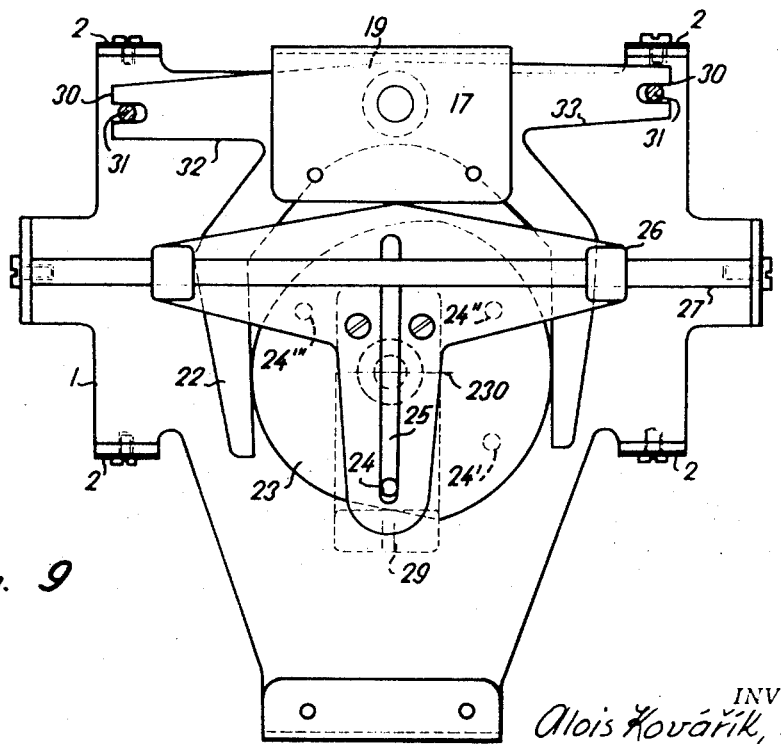

---

3,468,603
AUTOMATIC SLIDE PROJECTOR HAVING DUAL OPTICAL SYSTEM WITH A SINGLE MAGAZINE
Alois Kovarik, Prague, and Jindrich Suchanek, Brno, Czechoslovakia, assignors to Meopta, narodni podnik, Prerov, Czechoslovakia
Filed May 31, 1967, Ser. No. 642,537
Claims priority, application Czechoslovakia, June 2, 1966, 3,737/66
Int. Cl. G03b *21/26*
U.S. Cl. 353—94                    8 Claims

ABSTRACT OF THE DISCLOSURE

An automatically operated projector for sequentially projecting transparencies alternatingly through two optical systems having parallel axes. The transparencies are stored in a stack of pivotally mounted pockets of a magazine axially movable between the optical systems on a common support. The projector drive synchronously operates a shifting mechanism which simultaneously reciprocates the optical systems in opposite axial directions, and a pocket moving mechanism which swings a transversely aligned pocket into and out of an operative position in a receptacle of an associated optical system. The slide magazine is carried along when the optical system thereafter moves forward.

---

Background of the invention

This invention relates to automatic slide projectors, and particularly to a projector of the known type in which a series of transparencies is alternatingly projected through two optical systems on the same screen, the transparency in one system being changed while the transparency in the other system is being projected.

More specifically, the invention is concerned with a slide changing mechanism for a projector of the afore-described type. In an earlier application, we have disclosed a slide changing mechanism in which individual slides are sequentially transferred from pockets in a common magazine to receptacles in the two optical systems, and are returned to the original pockets after projection of their transparencies. The proper sequence of transfer operations is made possible in the known device by a relatively complex sequence of forward and backward movements of the magazine which is actuated by a relatively complex drive mechanism.

An object of the instant invention is the provision of a slide projector which is simpler, and therefore less costly and sturdier than our earlier invention.

Summary of the invention

In our present invention, we utilize a magazine equipped with pockets which may be moved relative to the body portion of the magazine to which they are attached. We provide means for simultaneously shifting the two optical systems in opposite axial directions between respective forward and rearward terminal position, and pocket moving means which move the magazine pockets between operative and inoperative position, the pockets in the inoperative position being juxtaposed in a stack in the common direction of the axes of the two optical systems. Movement between operative and inoperative pocket positions is transverse of that common direction, and a pocket in its operative position is partly received in the receptacle of an optical system when aligned with that receptacle. The shifting and pocket moving mechanisms have a common drive which operates them in timed sequence.

The spacing of the forward and rearward terminal positions of each optical system is equal to the axial center-to-center spacing of consecutive pockets in the aforementioned stack of a preferred embodiment of the invention. This permits operation of the changing mechanism in such a manner that each pocket is moved into the receptacle of an associated optical system when the optical system is in its rearward terminal position. When the system is then shifted toward its forward terminal position, the magazine is moved forward with the optical system. The pocket is then returned from the receptacle to the inoperative position in the stack, and the optical system is shifted toward its rearward terminal position.

Axially alternating pockets in the stack are respectively associated with the two optical systems. Since one optical system moves forwardly while the other one moves rearwardly, two simultaneous slide changing cycles can take place in the two systems, a pocket being inserted in the receptacle of one system shortly before a pocket is returned to the inoperative system from the receptacle of the other system.

The exact nature of this invention as well as other features, objects, and advantages thereof will be readily apparent from consideration of the following specification relating to the annexed drawings.

Brief description of the drawings

In the drawings:
FIG. 8 shows the projector of FIG. 6 in rear-elevational section on the line VIII—VIII of FIG. 6;
and
FIG. 9 shows the base portion of the same projector in plan view.

Description of the preferred embodiment

Figure 5:
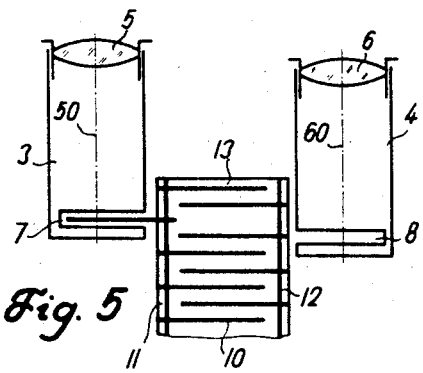
Figure 7:
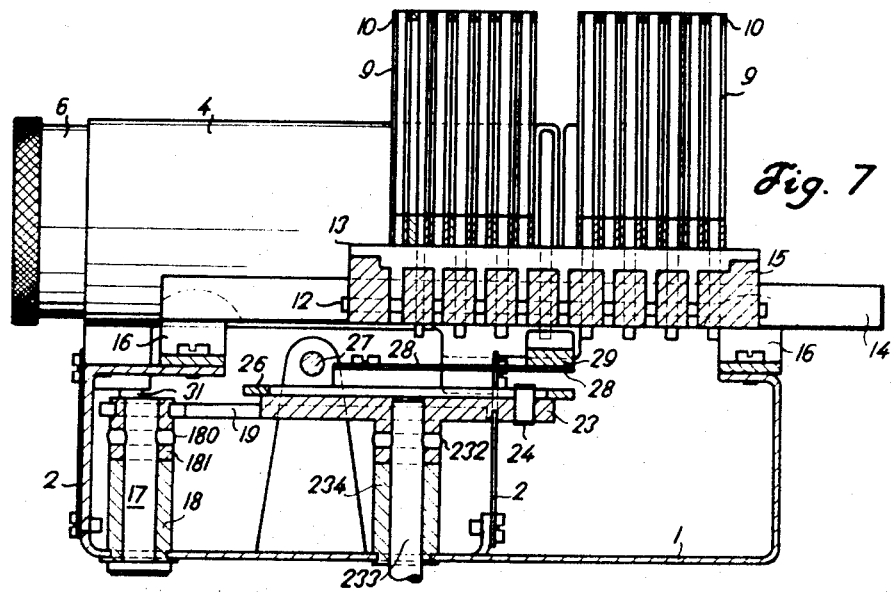
FIG. 7 shows the projector of FIG. 6 in side-elevational section on the line VII—VII of FIG. 6.
Figure 6:
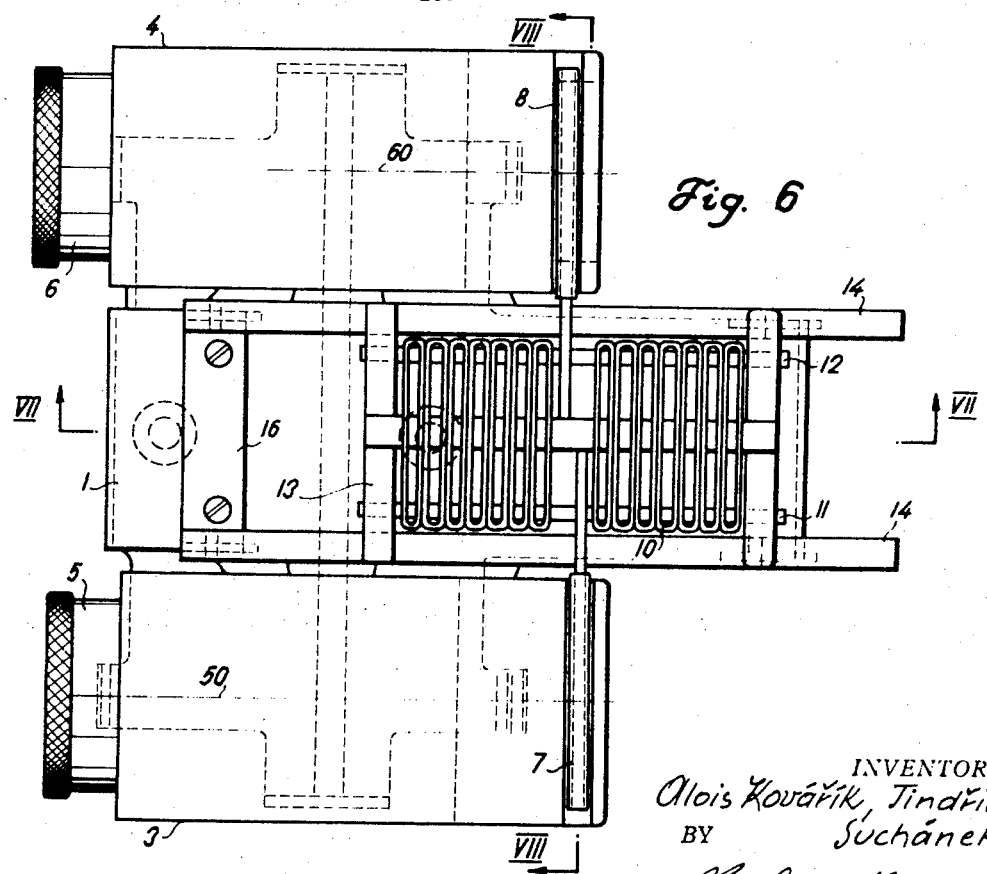
FIG. 6 shows the projector in more detail in plan view.

Referring now to the drawing in detail, and initially to FIGS. 6 to 8, the projector has a supporting frame 1 on which horizontal tubes 3, 4 are mounted in spaced parallel relationship on respective pairs of upright brackets 2 which are leaf springs. Lens barrels 5, 6 equipped with projection objectives (FIGS. 1 to 5) are received in the front ends of the tubes 3, 4 for focusing movement along the longitudinal axes 50, 60 of the tubes which coincide with the optical axes of the lens systems. The rear ends of the tubes 3, 4 are transversely slotted at 7, 8 to provide receptacles for the insertion of transparencies 9 into each optical system.

The frame 1 includes a guide platform for an elongated slide magazine 13. The platform consists mainly of two guide rails 14 parallel to the axes 50, 60 and connected by transverse straps 16. The magazine is of the type described in our copending application Ser. No. 642,536 filed on May 31, 1967 in which individual tranparencies 9 are held in frame-like pockets 10 normally stacked longitudinally of the magazine and pivoted on shafts 11, 12 for swinging movement relative to the body portion 15 of the magazine between the normal inoperative position in the stack and an operative position in a laterally aligned slot 7, 8. A lug on each pocket 10 projects in a downward direction from the associated shaft. The two side faces 130, 131 of the lug coverage toward the free end of the lug.

An upright bearing sleeve 18 is fixedly mounted near the front end of the median plane of the frame 1. It rotatably receives a pivot pin 17 which upwardly projects from the sleeve 18. Another sleeve 181 fixed on the top portion of the pivot pin 17 by a transverse pin 180 is attached to a horizontal rocker plate 19 which has four arms. Two arms 32, 33 which extend laterally in opposite directions from the pin 17 have slots 30 in their end faces. Pins 31 fixedly mounted on the undersides of the tubes 3, 4 are received in the slots 30.

Another upright bearing sleeve 234 rearwardly spaced from the sleeve 18 rotatably receives the drive shaft 233 of the projector. The lower end of the shaft 233, not seen in the drawings, is connected with an electric motor (not shown) and rotates at uniform speed during operation of the projector. A radial drive cam 23 is attached to the top end of the shaft 233 by a transverse pin 232. Two arms 22 of the rocker plate 19 form a cam follower fork and simultaneously engage diametrically opposite portions of the cam face.

The cam 23 is symmetrical relative to an axial plane 230 and carries an axial pin 24 which is offset 90° from the plane 230 and near the circumferential cam face. The pin projects into a slot 25, parallel to the axes 50, 60, in a T-shaped, motion-transmitting slide 26 which is movably mounted on a transverse guide rod 27 on the frame 1. The front end of a leaf spring 28, shown in phantom view in FIG. 9, and best seen in FIG. 7, is mounted on the slide 26 above the slot 25. Its free rear end carries an upwardly projecting abutment 29.

The lamp housing of the projector has been omitted from the drawings for the sake of clarity since it may be entirely conventional. It contains one or two lamps, condenser lenses and heat absorbing filters to direct a beam of light along each optical axis 50, 60 forward toward the lenses in the barrels 7, 8. The projector also includes a non-illustrated shutter system which alternatingly blocks passage of light through the tubes 3, 4 in a manner known in itself and not directly relevant to this invention.

When the drive cam 24 is rotated by the shaft 233 in a counterclockwise direction as viewed in FIG. 9, the rocker plate 19 is oscillated by its arms 22 through a small angle about the axis of the pivot pin 17, and the tubes 7, 8 are shifted forward and backward respectively in the direction of their axes 50, 60 on their resilient brackets 2 by the pins 31. Simultaneously, the circular movement of the pin 24 causes transverse reciprocating movement of the slide 26 on the guide rod 27 which brings the abutment 29 into camming engagement with the side faces 130, 131 on the lugs of aligned pockets 10 to pivot the pockets between their operative and inoperative positions. The resilient mounting of the abutment 29 on the spring 28 permits the abutment to pass laterally from the central position shown in FIG. 8 beyond an aligned lug by downwardly deflecting the free end of the spring 28.

Five sequential positions of the tubes 3, 4, of the magazine 13, and of its pockets 10 while the cam 23 revolves once and moves the pin 24 sequentially through the positions 24′, 24″, 24‴ are illustrated in FIGS. 1 to 5.

Figure 1:
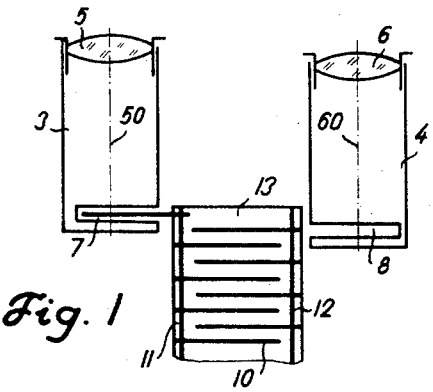
FIGS. 1 to 5 illustrate sequential positions of the principal operating elements in a slide projector of the invention in diagrammatic plan view.

In the position of FIG. 1, the tube 3 is in the forward terminal position of its axial reciprocating movement, and the tube 4 in its rearward terminal position. The first and other odd-numbered pockets 10 of the magazine are pivotally mounted on the shaft 11 near the tube 3 while the second and other even-numbered pockets 10 are mounted on the shaft 12 near the tube 4. The first pocket 10 is received in the slot 7 of the tube 3, and the transparency or slide retained in the pocket and not itself visible in FIG. 1, is being projected by the non-illustrated light source through the objective in the lens barrel 5 while light passage through the tube 4 and the barrel 6 is blocked by the non-illustrated shutter. The abutment 29 is located at the far right, as viewed in FIG. 8.

Figure 2:
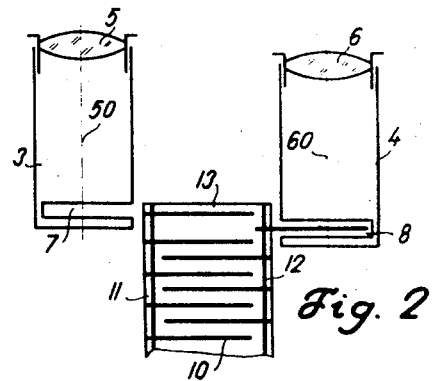

As the abutment moves toward the left, it strikes the side face 131 of the second pocket 10, causing the pocket to drop into the previously empty slot 8 of the tube 4. The abutment thereafter strikes the side face 131 of the first pocket 10, and swings the pocket from the slot 7 into its inoperative position, and the condition shown in FIG. 2 is reached. The path of light through the tube 4 is opened and that through the tube 3 is blocked by the non-illustrated shutter as soon the second pocket 10 is in the operative position.

Figure 3:
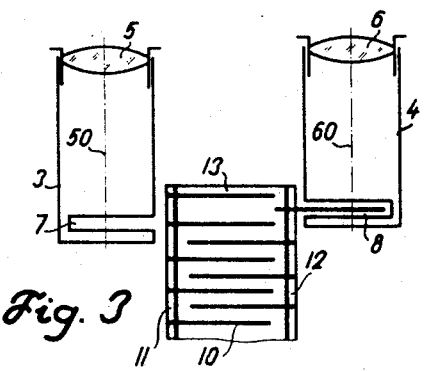

The rocker plate 19 next moves the tube 3 rearward and the tube 4 forward, the stroke of each tube being equal to the center-to-center spacing of two successive pockets 10. Because the second pocket 10 is engaged in the slot 8, the magazine 13 moves forward on the rails 14 by one pocket spacing with the tube 4 so that the third pocket 10 is aligned with the slot 7, as shown in FIG. 3.

Figure 4:
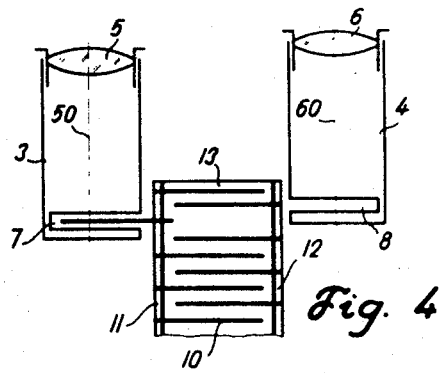

During its subsequent movement from the left to the right, the abutment 29 sequentially strikes the side faces 130 of the lugs on the third and second pocket 10, thereby first dropping the third pocket 10 into the slot 7, and thereafter returning the second pocket 10 to the inoperative position. The non-illustrated shutter blocks the tube 4 and simultaneously opens the tube 3 to the passage of light when the third pocket 10 is in the operative position, and before the second pocket is removed from the slot 8, and before the position of FIG. 4 is reached.

The tube 4 thereafter is moved backward by the rocker plate 19, and the tube 3 together with the magazine 13 is moved forward so that a new cycle can begin with the position of FIG. 5 which is identical with that of FIG. 1 except for the forward displacement of the magazine 13, and the substitution of the third pocket 10 for the first pocket in the slot 7. The sequence of steps described above is repeated during each rotation of the drive shaft 233 until all transparencies in the magazine 13 have been projected.

The tubes 3, 4 are moved axially while light passing therethrough projects an image on a non-illustrated screen. The distance traveled by each tube, however, is insignificant as compared to the distance between the projector and the screen, and the distance of the projected transparency from the associated lens system is not changed during tube movement. While the slots 7, 8 have been shown in FIGS. 1 to 5 for the sake of clarity to have an axial width much greater than that of the pockets 10, the pockets actually fit snugly into the slots, leaving just enough clearance for free swinging movement of the pockets. The sharpness of the projected image is thus not affected by the axial movement of the optical systems.

While the invention has been described with reference to a magazine whose pockets swing about two radially spaced axes, it is evident that modified magazines having a single pivot shaft for all pockets or differing from the illustrated magazine 13 in other features, as disclosed in our aforementioned copending application, are capable of operating in the same or in a closely similar manner.

It should be understood, therefore, that the foregoing disclosure relates only to a preferred embodiment of the invention, and that it is intended to cover all changes and modifications of the example of the invention chosen for the purpose of the disclosure which do not constitute departures from the spirit and scope of the invention set forth in the appended claims.

We claim:

1. In a slide projector having a support; two optical systems mounted on said support, each system including an objective having an optical axis, a receptacle for holding a transparency in said axis, and means for maintaining a fixed axial distance between said objective and said receptacle, said optical axes extending in a common direction; a slide magazine including a body portion and a plurality of pockets attached to said body portion and adapted to receive respective transparencies; guide means guiding said magazine on said support in said common direction, each pocket being movable relative to said body portion in a direction transverse of said common direction between an inoperative and an operative position, said pockets when in said inoperative position being juxtaposed in said common direction to constitute a stack of pockets, and each pocket being partly received in one of said receptacles when in the operative position while aligned with said one receptacle in said transverse direction; and a slide changing mechanism for sequentially inserting said pockets in said receptacles, the improvement in the slide changing mechanism which comprises:

(a) shifting means for simultaneously shifting said optical systems in opposite axial directions between respective forward and rearward terminal positions;
(b) pocket moving means for moving said pockets between said operative and inoperative positions thereof; and
(c) common drive means connected to said shifting means and to said pocket moving means for operating the same in timed sequence.

2. In a projector as set forth in claim 1, the spacing of said forward and rearward terminal positions of each system being equal to the axial center-to-center spacing of consecutive pockets of said stack.

3. In a projector as set forth in claim 2, said drive means operating said shifting means and said pocket moving means for moving each pocket into the receptacle of an associated optical system when said system is in the rearward terminal position thereof, for thereafter shifting the associated optical system toward the forward terminal position, whereby the magazine is moved forward in said common direction, for then returning said pocket to the inoperative position thereof, and for finally shifting said associated optical system to the rearward terminal position, axially alternating pockets in said stack being respectively associated with said two systems.

4. In a projector as set forth in claim 1, said shifting means including a rocker member mounted on said support for oscillating movement about an axis, spaced portions of said rocker member being operatively connected to said systems respectively for simultaneously shifting the systems between said positions thereof.

5. In a projector as set forth in claim 4, said portions of said rocker member being oppositely spaced from said axis.

6. In a projector as set forth in claim 1, said drive means including a drive member, means for continuously rotating said drive member about an axis, and two motion transmitting means interposed between said drive member and said pocket moving means and shifting means respectively.

7. In a projector as set forth in claim 6, said drive member being a cam having a cam face about said axis, and one of said motion transmitting means including cam follower means engaging said face.

8. In a projector as set forth in claim 7, the other motion transmitting means including a motion transmitting member movably mounted on said frame and formed with a slot, and pin means on said cam member and spaced from said axis thereof, said pin means engaging said slot.

References Cited
UNITED STATES PATENTS

| | | | |
|---|---|---|---|
| 3,093,030 | 6/1963 | Carrillo | 353—86 |
| 3,161,109 | 12/1964 | Carrillo | 353—86 |
| 3,171,222 | 2/1965 | Sakaki et al. | 353—118 |
| 3,174,395 | 3/1965 | Krull | 353—118 |
| 3,194,115 | 7/1965 | Giwosky | 353—83 |
| 3,369,452 | 2/1968 | Grenier | 353—90 |

NORTON ANSHER, Primary Examiner

RICHARD M. SHEER, Assistant Examiner

U.S. Cl. X.R.

353—86, 90, 116, 118